(12) United States Patent
Kim et al.

(10) Patent No.: US 12,397,926 B2
(45) Date of Patent: Aug. 26, 2025

(54) VERTIPORT SYSTEM INCLUDING TRANSFER UNIT USING RAIL MOVING DEVICE

(71) Applicants: Hyundai Motor Company, Seoul (KR); Kia Corporation, Seoul (KR)

(72) Inventors: Jae Hak Kim, Hwaseong-si (KR); Jun Ki Choi, Seoul (KR); Choung Hyoung Kim, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/611,029

(22) Filed: Mar. 20, 2024

(65) Prior Publication Data
US 2025/0171162 A1    May 29, 2025

(30) Foreign Application Priority Data
Nov. 28, 2023   (KR) .......................... 10-2023-0167995

(51) Int. Cl.
*B64F 1/223*    (2024.01)
(52) U.S. Cl.
CPC .................................. *B64F 1/223* (2024.01)
(58) Field of Classification Search
CPC ....... B61B 10/00; B61B 10/001; B61B 13/00; B64F 1/002; B64F 1/007; B64F 1/04; B64F 1/06; B64F 1/12; B64F 1/125; B64F 1/16; B64F 1/22; B64F 1/222; B64F 1/223; B64F 1/224; B64F 1/225; B64F 1/226; B64F 1/227; B64F 1/228; B64F 1/24; B64G 1/002; B64G 1/005; B64U 70/90; B64U 70/97; B64U 70/99; E01B 21/00; E01B 25/00; E01B 25/22; E01B 25/28; E04H 6/44
USPC ......... 104/106, 107, 110, 139, 140; 244/116
See application file for complete search history.

(56) References Cited

U.S. PATENT DOCUMENTS

| | | | | |
|---|---|---|---|---|
| 4,036,147 A | * | 7/1977 | Westling | ................... B64F 3/02 |
| | | | | 104/23.1 |
| 4,529,152 A | | 7/1985 | Bernard | |
| 4,823,704 A | * | 4/1989 | Fujita | ........................ B61B 5/02 |
| | | | | 104/247 |
| 5,014,625 A | * | 5/1991 | Murai | .................... B65G 23/23 |
| | | | | 105/176 |
| 5,199,358 A | * | 4/1993 | Barratt | .................... B61C 11/06 |
| | | | | 105/215.1 |

(Continued)

FOREIGN PATENT DOCUMENTS

| | | |
|---|---|---|
| CN | 102343981 A | 2/2012 |
| CN | 109878754 A | 6/2019 |

(Continued)

*Primary Examiner* — Joshua E Rodden
(74) *Attorney, Agent, or Firm* — Slater Matsil, LLP

(57) ABSTRACT

A vertiport system according to an embodiment may include a first area, a second area provided in a different position from the first area, and a transfer unit configured to transfer an aircraft between the first area and the second area, wherein the transfer unit may include a transfer rail connecting the first area and the second area, and a moving device configured to accommodate at least a portion of a landing gear of the aircraft and the moving device being configured to move along the transfer rail.

18 Claims, 9 Drawing Sheets

(56) References Cited

U.S. PATENT DOCUMENTS

| | | | | |
|---|---|---|---|---|
| 6,401,625 | B1* | 6/2002 | Henderson | B60P 3/077 |
| | | | | 104/243 |
| 6,564,721 | B2* | 5/2003 | Stiles | E01B 25/00 |
| | | | | 104/243 |
| 7,232,092 | B2* | 6/2007 | Yamamoto | B64G 1/002 |
| | | | | 244/63 |
| 8,485,468 | B2* | 7/2013 | Binnebesel | B64F 1/228 |
| | | | | 244/116 |
| 9,156,564 | B2* | 10/2015 | Endres | B64F 1/06 |
| 10,676,283 | B2* | 6/2020 | Gümbel | B62D 65/18 |
| 11,155,362 | B2 | 10/2021 | Uskolovsky | |
| 2003/0145760 | A1* | 8/2003 | Hadley | E04H 6/44 |
| | | | | 105/28 |
| 2011/0061559 | A1* | 3/2011 | Lund | B60L 5/36 |
| | | | | 191/29 R |
| 2017/0137149 | A1* | 5/2017 | Malicki | B64F 1/22 |
| 2022/0089294 | A1 | 3/2022 | Bi | |
| 2023/0159192 | A1* | 5/2023 | Gil | B64U 80/25 |
| | | | | 244/137.1 |

FOREIGN PATENT DOCUMENTS

| | | | | |
|---|---|---|---|---|
| JP | 04317852 | A * | 11/1992 | |
| JP | H0635280 | B2 | 5/1994 | |
| JP | 2022520924 | A | 4/2022 | |
| KR | 20110125998 | A | 11/2011 | |
| KR | 101721417 | B1 | 3/2017 | |
| WO | WO-9809861 | A1 * | 3/1998 | B60L 50/50 |

* cited by examiner

VERTIPORT SYSTEM INCLUDING TRANSFER UNIT USING RAIL MOVING DEVICE

CROSS-REFERENCE TO RELATED APPLICATIONS

This application claims the benefit of Korean Patent Application No. 10-2023-0167995, filed on Nov. 28, 2023, which application is hereby incorporated herein by reference in its entirety.

TECHNICAL FIELD

The present disclosure relates to a vertiport system including a transfer unit using a rail moving device.

BACKGROUND

Recently, urban air mobility (UAM) for future transportation and traffic service systems is being developed. UAM may be an aircraft capable of vertical takeoff and landing flights, and along with the development of the UAM, the development of a vertiport, a takeoff and landing site of the UAM, is required.

A vertiport has infrastructure or systems with support services and equipment for landing, ground handling, and take-off of manned or unmanned vertical takeoff and landing (VTOL) aircraft. The vertiport is generally considered to be installed on rooftops of high-rise buildings or large parks. The vertiport may have a smaller footprint with smaller landing and take-off regions, as compared to typical airports having typical runways.

On the other hand, the UAM requires ground driving movement for various purposes, such as customers getting on or off a vehicle/charging/parking/hangar transfer within the vertiport, etc.

SUMMARY

The present disclosure relates to a vertiport system including a transfer unit using a rail moving device.

An embodiment of the present disclosure can provide a vertiport system capable of safely transferring an aircraft in a designed, selected, preset, or predetermined transfer trajectory using a rail moving device moving along a rail.

According to an embodiment of the present disclosure, a vertiport system may include a first area, a second area provided in a different position from the first area, and a transfer unit provided to transfer an aircraft between the first area and the second area, wherein the transfer unit comprises a transfer rail connecting the first area and the second area and a moving device in which at least a portion of a landing gear of the aircraft is accommodated and which moves along the transfer rail.

In an embodiment, the moving device may include a jig to which the landing gear is connected, a wheel rotatably connected to the jig, and a motor connected to the jig and providing driving force to rotate the wheel.

In an embodiment, the jig may include a gear settling portion in which the landing gear is accommodated, and a wheel connection portion to which the wheel is connected, and the motor may be provided in the wheel connection portion and coupled to the wheel.

In an embodiment, the vertiport system may further include a moving device controller configured to control an operation of the moving device, and the moving device may further include a communication controller configured to receive a signal from the moving device controller or transmit a signal to the moving device controller.

In an embodiment, the moving device controller may generate a moving signal including at least one of whether the moving device is driven, a moving speed, and a moving direction and may transmit the moving signal to the communication controller.

In an embodiment, the communication controller may be connected to the motor, and may control driving of the motor based on the moving signal received from the moving device controller.

In an embodiment, the wheel connection portion may be positioned below the gear settling portion, and the gear settling portion may include a settling groove having a tapered shape narrowing downwardly.

In an embodiment, the gear settling portion may include a bottom surface on which the landing gear is accommodated, and a pair of guide surfaces extending obliquely outwardly from both sides of the bottom surface to an upward direction.

In an embodiment, the guide surface may guide the landing gear to be aligned with the bottom surface in the process of settling the landing gear in the gear settling portion due to a movement of the aircraft.

In an embodiment, the first area, the second area and the transfer rail may be provided on a floor of a port body, and a rail accommodating groove recessed to a designed, selected, or predetermined depth may be formed in the floor so that the transfer rail is positioned.

In an embodiment, the rail accommodating groove may be recessed to a specified depth so that the bottom surface is positioned at the same height as the floor, in a state in which the moving device is accommodated on the transfer rail.

In an embodiment, the rail accommodating groove may be recessed to a specified depth so that the bottom surface is positioned at a height lower than the floor by a specified length, in a state in which the moving device is accommodated on the transfer rail.

In an embodiment, the landing gear of the aircraft may include a nose gear, a first main gear, and a second main gear, the moving device may include a first moving device on which the first main gear is accommodated, and a second moving device on which the second main gear is accommodated, and the transfer rail may include a first rail along which the first moving device moves, and a second rail along which the second moving device moves.

In an embodiment, the first rail and the second rail have the same shape and are spaced apart from each other at a specified interval, and in a state in which the moving device is positioned on the transfer rail and the main gear is accommodated in the moving device, the nose gear may be in contact with a portion of the floor positioned between the first rail and the second rail.

In an embodiment, the transfer rail may be formed to have a shape including a straight section and a curved section, and the moving device controller may control the first moving device and the second moving device so that the first moving device and the second moving device move at different speeds in the curved section.

According to an embodiment of the present disclosure, a rail moving device may include a jig to which landing gear of an aircraft is connected, a wheel rotatably connected to the jig and moving along a rail, and a motor connected to the jig and providing driving force to rotate the wheel, where the jig may include a gear settling portion in which the landing gear is accommodated, and a wheel connection portion to which the wheel is connected, and the motor may be provided in the wheel connection portion and coupled to the wheel.

In an embodiment, the wheel connection portion may extend downwardly from the gear settling portion, and the gear settling portion may include a settling groove having a tapered shape narrowing downwardly, and the landing gear may be accommodated in the settling groove.

In an embodiment, the gear settling portion may include a bottom surface on which the landing gear is accommodated, and a pair of guide surfaces extending obliquely outwardly from both sides of the bottom surface to an upward direction.

In an embodiment, the guide surface may guide the landing gear to be aligned with the bottom surface in the process of settling the landing gear in the gear settling portion.

In an embodiment, the rail moving device may further include a communication controller connected to the motor and configured to control driving of the motor based on a moving signal received from an external controller, and the moving signal may include at least one of whether the rail moving device is driven, a moving speed, and a moving direction.

According to an embodiment of the present disclosure, by transferring an aircraft using a rail moving device moving along a rail, it may be possible to safely and easily transfer the aircraft in a designed, selected, or predetermined transfer trajectory within a narrow space.

BRIEF DESCRIPTION OF THE DRAWINGS

The above and other features and advantages of the present disclosure can be more clearly understood from the following detailed description, taken in conjunction with the accompanying drawings, in which.

DETAILED DESCRIPTION OF ILLUSTRATIVE EMBODIMENTS

Figure 1:
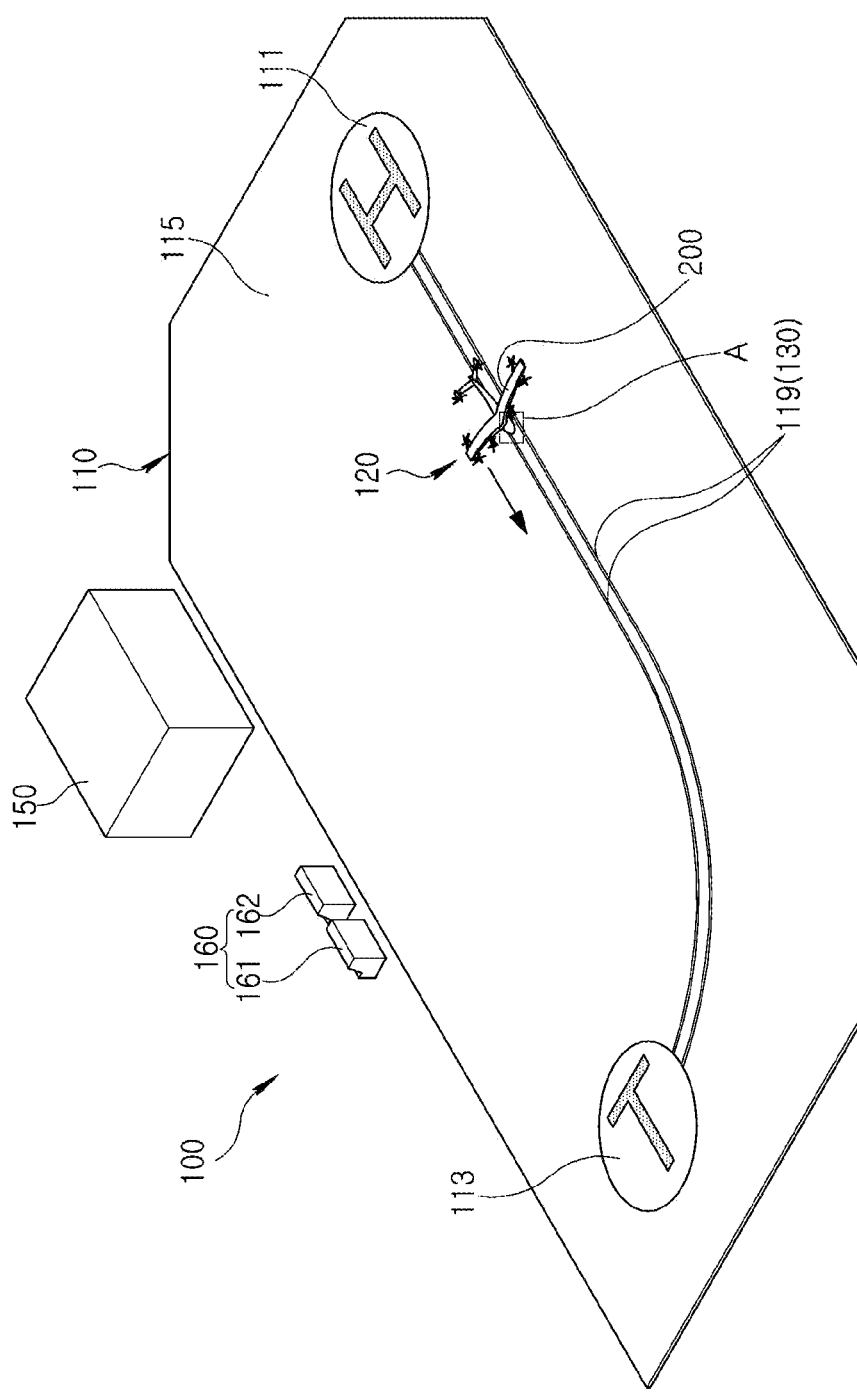
FIG. 1 is a perspective view illustrating a vertiport system according to an embodiment of the present disclosure.

Various changes and various embodiments of the present disclosure are possible, and specific example embodiments thereof will be described and illustrated in the drawings hereinafter. However, the example embodiments are not intended for necessarily limiting the present disclosure. Ideas of the present disclosure can be extended to any alterations, equivalents, and substitutes besides the accompanying drawings.

It can be understood that although the terms "first," "second," and the like, may be used herein to describe various elements, these elements are not necessarily limited by such terms. Such terms can be generally used merely to distinguish one element from another. For example, a first element can be termed a second element, and, similarly, a second element can be termed a first element, without departing from the scope of the present disclosure. The term "and/or" can encompass a combination of plural items or any one of the plural items.

Terms used herein can be for the purpose of describing particular example embodiments only and are not intended to be necessarily limiting of the present disclosure. The singular can also include the plural unless specifically stated otherwise in the phrase. It can be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, terms including technical and scientific terms used herein can have a same meaning as commonly understood by one of ordinary skill in the art to which example embodiments of the present disclosure pertain. It can be further understood that terms, such as those defined in commonly used dictionaries, can be interpreted as having meanings that are consistent with their meanings in the context of the relevant art.

In the present specification, an aircraft may refer to a mobility vehicle that may move by flying in the sky. In addition to referring to helicopters, drones, fixed-wing airplanes, and the like, an aircraft may include vehicles that can move on the ground using wheels and then fly with the wheels separated from the ground. In addition, an aircraft may include a manned aircraft and an unmanned aircraft. The manned aircraft may include an airplane that can be operated by autonomous flight, in addition to an airplane controlled by a pilot.

Hereinafter, embodiments of the present disclosure will be described with reference to the attached drawings.

Figure 2:
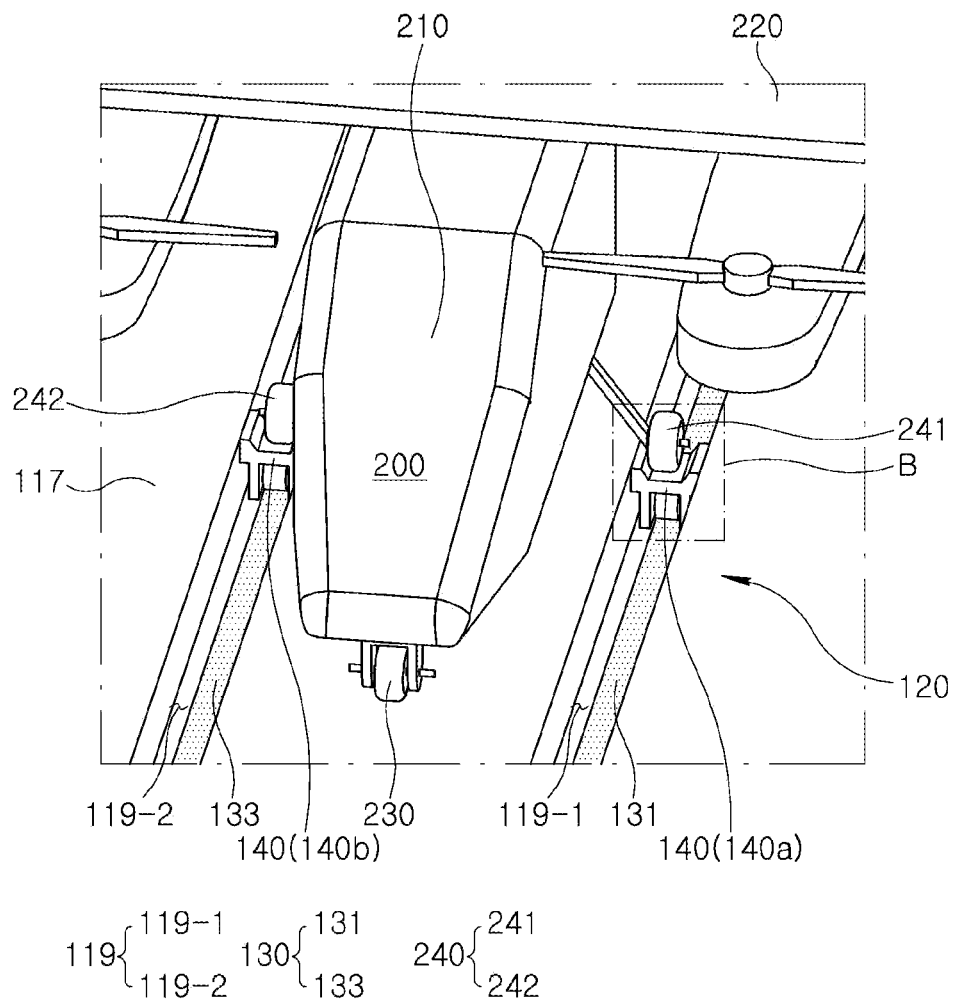
FIG. 2 is a perspective view illustrating a state in which an aircraft is connected to a transfer unit of a vertiport system according to an embodiment of the present disclosure.

FIG. 1 illustrates a vertiport system 100 according to an embodiment of the present disclosure. FIG. 2 illustrates a state in which an aircraft 200 is connected to a transfer unit 120 of the vertiport system 100 according to an embodiment of the present disclosure.

FIG. 1 is a view schematically illustrating a vertiport system 100 according to an embodiment. FIG. 2 is an enlarged view of part A illustrated in FIG. 1.

The vertiport system 100 according to an embodiment is a takeoff and landing site (e.g., a vertical takeoff and landing airfield or station) for the aircraft 200 capable of vertical takeoff and landing (VTOL), and may include infrastructure configured to receive an aircraft from a flight, reset the aircraft for a subsequent flight, and allow the aircraft to depart for a subsequent flight. The aircraft 200 may be air mobility including Urban Air Mobility (UAM) and Advanced Air Mobility (AAM), and the type of aircraft 200 is not particularly limited.

The vertiport system 100 refers to various facilities providing space for vertical takeoff and landing of aircraft, and may be understood as including Verti-hub, Verti-port, or Verti-stop, classified according to size. For example, a Verti-hub can be the largest UAM takeoff and landing site, and may enable large-scale transfer of surrounding traffic of airports or the like, may have support an infrastructure such as charging and maintenance, and may allow multiple UAM vehicles to park after their operation ends. A Verti-port is a smaller takeoff and landing site than the Verti-hub, and may have a vehicle support infrastructure (charging, maintenance, etc.) and may also provide passenger convenience facilities. A Verti-stop is smaller than the Verti-port and may be a small takeoff and landing site with one or two aprons.

Referring to FIGS. 1 and 2, the vertiport system 100 according to an embodiment may include a port body 110, a transfer unit 120, a control unit 150, and a controller 160.

The port body 110 may be equipped to allow the aircraft 200 to take off or land, stop, or move. For example, the port body 110 may be equipped with components and/or auxiliary facilities for takeoff, landing, stopping, and movement of the aircraft 200.

The port body 110 may include a takeoff and landing area 111 in which the aircraft 200 takes off or lands, and a transfer area 113 for stopping the aircraft 200 or moving the aircraft 200 to another area provided in the port body 110 (or the vertiport system 100). One or more of each of the takeoff and landing area 111 and the transfer area 113 may be provided. On the other hand, the takeoff and landing area 111 and the transfer area 113 are examples of separate areas provided for the aircraft 200 to be transferred, located, or stopped, and may also be referred to as a first area and a second area, according to various embodiments.

The takeoff and landing area 111 and the transfer area 113 may be provided at different positions in the port body 110. The takeoff and landing area 111 may be provided in a partial region of the port body 110, and the transfer area 113 may be provided in another area of the port body 110 separated from the takeoff and landing area 111. For example, the port body 110 may be configured in a layout in which the takeoff and landing area 111 is positioned on one side of a base area 115, and the transfer area 113 is positioned on the other side of the base area 115.

The aircraft 200 may take off or land vertically in the takeoff and landing area 111. The aircraft 200 that landed in the takeoff and landing area 111 may be transferred to the transfer area 113 through the transfer unit 120. Additionally, the aircraft 200 located in the transfer area 113 may be transferred to the takeoff and landing area 111 through the transfer unit 120.

The takeoff and landing area 111 and the transfer area 113 may be provided in the form of a circular platform installed in the port body 110 (or the base area 115). According to various embodiments, at least one of the takeoff and landing area 111 and the transfer area 113 may be rotatable with respect to the port body 110. The circular platform of the takeoff and landing area 111 and/or the transfer area 113 may be provided to physically rotate. For example, at least one of the takeoff and landing area 111 and the transfer area 113 may be provided with a motor for rotating the circular platform, and the circular platform may be coupled to be rotated by a motor. The takeoff and landing area 111 and the transfer area 113 may be turntables.

The transfer area 113 may be rotatable with respect to the port body 110. For example, the transfer area 113 (i.e., the circular platform of the transfer area 113) may rotate with respect to the base area 115 and the takeoff and landing area 111 of the port body 110. An aircraft 200 stopped in the transfer area 113 may rotate with the transfer area 113 as the transfer area 113 rotates, and may adjust a direction in which the aircraft 200 located in the transfer area 113 is headed based on the rotation of the transfer area 113.

The transfer area 113 may be an area in which the aircraft 200 transferred from the takeoff and landing area 111 temporarily stops before being transferred to another area, or may be an area in which the aircraft 200 transferred from other areas temporarily stops before being transferred to the takeoff and landing area 111. Additionally, in another example, the transfer area 113 may be an area in which the aircraft 200 temporarily stops for boarding or disembarking boarded passengers and/or loaded cargo, but the present disclosure is not necessarily limited thereto.

The transfer area 113 may be configured to transfer the aircraft 200 to a maintenance area, a charging area, a boarding and disembarking area, a transfer area, and a containment area provided in the vertiport system 100 (or a smart building including the vertiport system 100). For example, FIG. 1 may be understood as a view schematically illustrating a rooftop of a building including the vertiport system 100, and the transfer area 113 (i.e., the circular platform of the transfer area 113) may be provided to enable ascending and descending in a building, such as an elevator.

The transfer unit 120 may transfer/move the aircraft 200. For example, the transfer unit 120 may be provided to move the aircraft 200 between the takeoff and landing area 111 and the transfer area 113. The takeoff and landing area 111 and the transfer area 113 are examples, and the transfer unit 120 is not necessarily limited to transferring the aircraft 200 between the takeoff and landing area 111 and the transfer area 113, and according to various embodiments, the transfer unit 120 may be provided to transfer the aircraft 200 between the first area and the second area, which are separated and recognized from each other.

The transfer unit 120 may include a transfer rail 130 and a moving device 140. The transfer rail 130 may be provided in the port body 110 and may connect the takeoff and landing area 111 and the transfer area 113. The moving device 140 may move between the takeoff and landing area 111 and the transfer area 113 along the transfer rail 130.

Referring to FIG. 2, the transfer unit 120 may be provided to tow and transfer the aircraft 200 by settling at least a portion of the landing gear of the aircraft 200 in the moving device 140 and allowing the moving device 140 to move along the transfer rail 130.

The aircraft 200 can be air mobility capable of vertical takeoff and landing, and may include an airframe 210 (or fuselage) capable of boarding passengers and/or loading cargo, a wing portion 220 coupled to an upper portion of the airframe 210 and provided with a rotor for generating lifting force, and a plurality of landing gear members 230, 240 coupled to the lower part of the aircraft 200 and configured to support takeoff, landing, and ground running of the aircraft 200. The plurality of landing gear members may include a nose gear 230 positioned in the front and two main gear members 240 located in the rear. For example, the main gear 240 may include a first main gear 241 positioned on the right side with respect to the airframe 210 and a second main gear 242 positioned on the left side with respect to the airframe 210.

The transfer rail 130 may be installed in the port body 110. For example, the transfer rail 130 may be installed on a floor 117 of the port body 110 so that the transfer rail 130 is positioned between the takeoff and landing area 111 and the transfer area 113. The transfer rail 130 may extend from the takeoff and landing area 111 to the transfer area 113. The transfer rail 130 may be connected to the takeoff and landing area 111 and the transfer area 113 so that the aircraft 200 positioned in the takeoff and landing area 111 or the transfer area 113 may move and the main gear 240 may be accommodated in the moving device 140 arranged on the transfer rail 130.

The transfer rail 130 may be formed to have a shape including at least one of a straight section and a curved section. According to the embodiment illustrated in FIG. 1, the transfer rail 130 may extend from the takeoff and landing area 111 in a straight section and then may extend to the transfer area 113 while being deformed into the curved section. However, the shape and/or structure of the transfer rail 130 is not limited to the illustrated embodiment, and may be modified in various manner in response to the locations of each area in which the aircraft 200 is to be transferred. For example, the transfer rail 130 may be composed of only straight sections.

The transfer rails 130 may be provided as a pair so that two moving devices 140 may run/move while supporting two main gear members 240 of the aircraft 200, respectively. The transfer rail 130 may include a first rail 131 on which a first moving device 140a moves and a second rail 133 on which a second moving device 140b moves.

Referring to FIG. 2, a rail accommodating groove 119 in which the transfer rail 130 is installed may be formed in the port body 110, and the transfer rail 130 may be positioned in the rail accommodating groove 119. The rail accommodating groove 119 may be formed by recessing at least a portion of the floor 117 into a shape corresponding to the transfer rail 130. The rail accommodating groove 119 may include a first accommodating groove 119-1 in which the first rail 131 is installed, and a second accommodating groove 119-2 in which the second rail 133 is installed.

The moving device 140 may be connected to and/or fastened to the transfer rail 130 to move along the transfer rail 130. The moving device 140 may transfer the aircraft 200 between the takeoff and landing area 111 and the transfer area 113 by moving along the transfer rail 130 in which the main gear 240 of the aircraft 200 is accommodated on at least a portion of the moving device 140. For example, the moving device 140 may be referred to as a railcar.

The moving device 140 may move along the transfer rail 130 based on a control signal transmitted from a moving device controller 161. For example, the moving device 140 may receive moving information including whether the moving device 140 is driven, a moving speed, a moving direction, or any combination thereof, from the moving device controller 161 through communication, etc., and may operate based on the moving information.

The moving device 140 may be comprised of two moving devices 140 so that the two main gear members 240 of the aircraft 200 are respectively accommodated. The moving device 140 may include a first moving device 140a in which the first main gear 241 is accommodated and moves along the first rail 131, and a second moving device 140b in which the second main gear 242 is accommodated and moves along the second rail. The first moving device 140a and the second moving device 140b may have substantially the same structure, shape, and configuration.

In a state where the main gear 240 of the aircraft 200 is accommodated in the moving device 140, the nose gear 230 of the aircraft 200 may be in contact with a portion of the floor 117 positioned between the first accommodating groove 119-1 (or first rail 131) and the second accommodating groove 119-2 (or second rail 133). The nose gear 230 may move while rotating on the floor 117 when the moving device 140 moves along the transfer rail 130, thus transferring the aircraft 200.

The first moving device 140a and the second moving device 140b may be driven by receiving separate control signals from the moving device controller 161. The first moving device 140a and the second moving device 140b may move at the same speed or may move at different speeds, depending on a section of the transfer rail 130. For example, in a straight section of the transfer rail 130, the first moving device 140a and the second moving device 140b may move in the same direction at the same speed, and in a curved section of the transfer rail 130, the first moving device 140a and the second moving device 140b may move in the same direction at different speeds.

For an embodiment, the specific configuration of the moving device 140 and the structure in which the main gear 240 is accommodated in the moving device 140 will be described in more detail with reference to FIGS. 3 and 4 below.

The control unit 150 serves to manage and monitor the vertiport system 100 in an integrated manner and may control takeoff, landing, stopping, and transfer of the aircraft 200. The control unit 150 may be positioned adjacent to the takeoff and landing area 111, and may provide control information on take-off, landing, and transfer of the aircraft 200 to the controller 160 and/or ground personnel in comprehensive consideration of an operating environment in a control area.

The controller 160 may control an activation and an operation of at least a portion of the vertiport system 100. The controller 160 may include a moving device controller 161 controlling the moving device 140 of the transfer unit 120, and a platform controller 162 controlling the rotation of the transfer area 113 and/or the takeoff and landing area 111.

The moving device controller 161 may control the driving and movement of the moving device 140. For example, the moving device controller 161 may control at least one of whether each of the first moving device 140a and the second moving device 140b is driven, the moving direction, and the moving speed, or any combination thereof, for example. The moving device controller 161 may control the moving speeds of the first moving device 140a and the second moving device 140b to be different from each other so that the moving device 140 may move the curved section of the transfer rail 130. The moving device controller 161 may control the moving device 140 by transmitting and receiving control signals through a communication controller (e.g., the communication controller 148 in FIG. 3) provided in the moving device 140.

The platform controller 162 may control a rotational operation of a platform in the transfer area 113. However, the platform controller 162 is not limited to rotation control of the transfer area 113, and according to various embodiments, when the takeoff and landing area 111 is rotatably provided, the platform controller 162 may be provided to control the rotational operation of the platform of the takeoff and landing area 111.

FIG. 1 schematically illustrates a vertiport system 100 according to an embodiment, and the configurations of the vertiport system 100 are not limited to the illustrated embodiment, and the vertiport system 100 may further include other components (such as a takeoff and landing guide unit, a walking area, etc.) according to various embodiments.

Furthermore, according to the embodiment illustrated in FIG. 1, the vertiport system 100 may include one takeoff and landing area 111 and one transfer area 113, but the present disclosure is not limited thereto. According to various embodiments, the vertiport system 100 may include two or more of at least one of the takeoff and landing area 111 and the transfer area 113. For example, the vertiport system 100 may include one takeoff and landing area 111 and a plurality of transfer areas 113, and the transfer rail 130 may be provided to connect the plurality of transfer areas 113 and the takeoff and landing area 111. In this case, the transfer rail 130 may extend from the takeoff and landing area 111, and at least a portion thereof may be branched to be connected to the plurality of transfer areas 113, and a rail changer configured to change or convert a moving direction of the moving device 140 may be provided at a branch point corresponding to a position in which the aircraft 200 is to be transferred.

Figure 3:
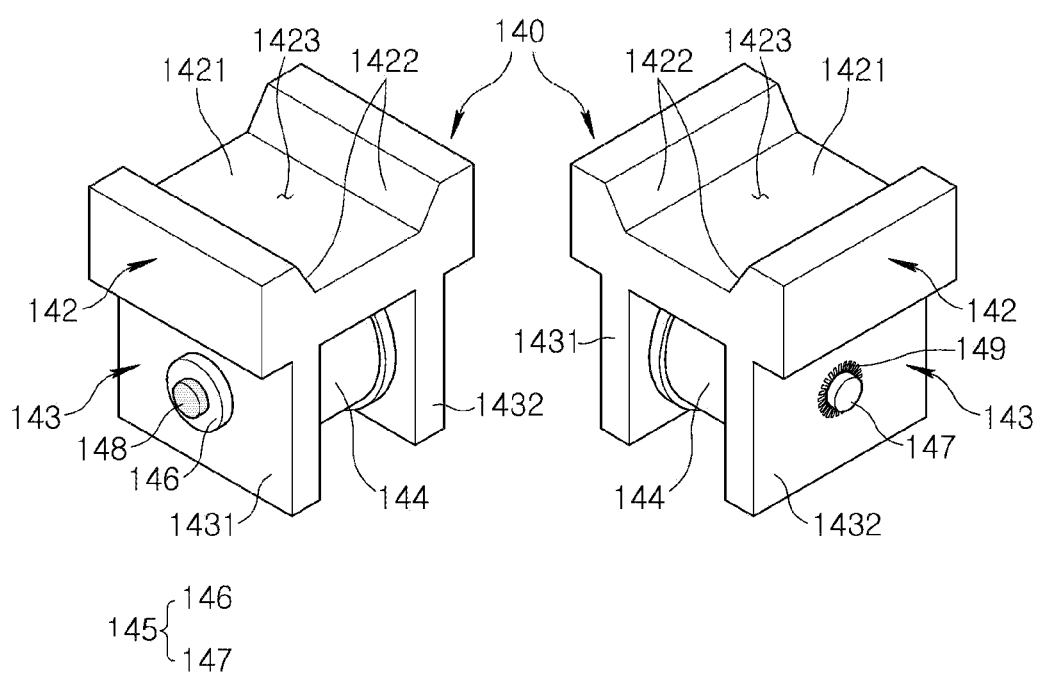
FIG. 3 are perspective views illustrating a moving device of a vertiport system according to an embodiment of the present disclosure.

FIG. 3 illustrates a moving device 140 of the vertiport system 100 according to an embodiment of the present disclosure. FIG. 4 illustrates a state in which a main gear 240 of an aircraft 200 is accommodated in the moving device 140 of the vertiport system 100 according to an embodiment of the present disclosure.

FIG. 3 is a view illustrating a perspective view of the moving device 140 as seen from the left and a perspective view of the moving device 140 as seen from the right, respectively. FIG. 4 is an enlarged view of part B illustrated in FIG. 2.

Figure 4:
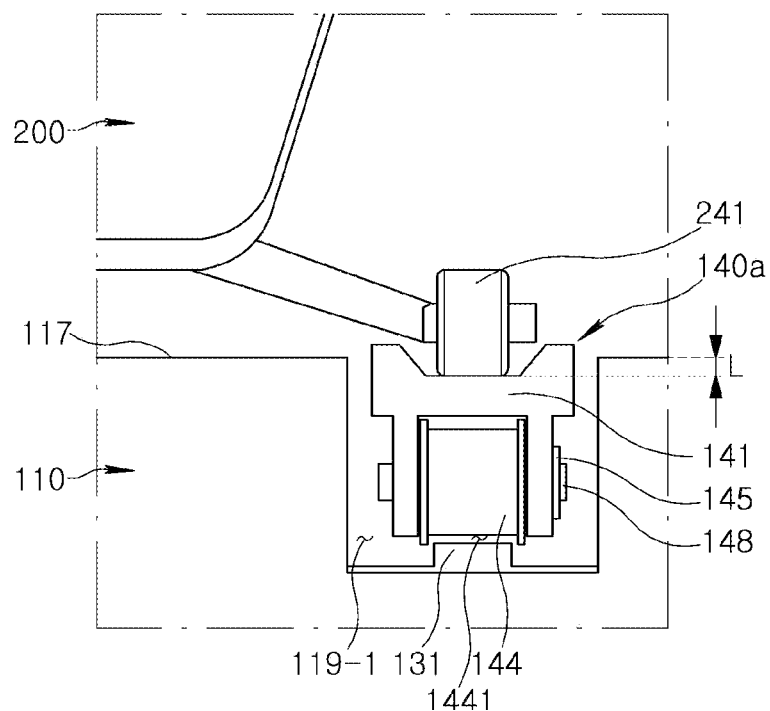
FIG. 4 is a front view illustrating a state in which a main gear of an aircraft is accommodated in a moving device of a vertiport system according to an embodiment of the present disclosure.

FIG. 4 illustrates a first moving device 140a in which a first main gear 241 of the aircraft 200 is accommodated and a first rail 131 in a first accommodating groove 119-1 in which the first moving device 140a is accommodated, but the structure illustrated in FIG. 4 may be equally applied to a second main gear 242, a second moving device 140b, a second accommodating groove 119-2, and a second rail 133, for example. Hereinafter, in describing FIG. 4, the components are not divided into 'first' and 'second', and will be described as a rail accommodating groove 119, a transfer rail 130, a moving device 140, and a main gear 240, collectively.

Referring to FIGS. 3 and 4, the moving device 140 according to an embodiment may be equipped with independent driving equipment and communication equipment and may move along the transfer rail 130, and be configured so that the main gear 240 of the aircraft 200 is accommodated therein.

The moving device 140 may include a jig 141, a wheel 144, a motor 145, and a communication controller 148. The moving device 140 may be provided in a form in which the wheel 144, the motor 145, and the communication controller 148 are positioned and mounted in the jig 141. Although the embodiment of FIG. 3 shows one wheel 144 per moving device 140, in other embodiments, any number of wheels (driven and undriven) may be incorporated per moving device 140.

The jig 141 may be configured so that the main gear 240 of the aircraft 200 to be transferred is accommodated therein, and may support the wheels 144 and other components (e.g., a motor 145 and a communication controller 148) of the moving device 140.

The jig 141 may include a gear settling portion 142 in which the main gear 240 is accommodated, and a wheel connection portion 143 that extends from the gear settling portion 142 and to which the wheel 144 is connected. The gear settling portion 142 may form an upper portion of the jig 141, and the wheel connection portion 143 may form a lower portion of the jig 141.

The gear settling portion 142 may be provided with a settling groove 1423 that is concavely formed so that the main gear 240 is accommodated. The settling groove 1423 may guide the settling of the main gear 240, and may be formed in a tapered shape to enable the settling of the main gear 240 of various sizes.

The gear settling portion 142 may include a bottom surface 1421, parallel to the floor 117 and the transfer rail 130, and a pair of guide surfaces 1422 that extend obliquely outwardly from two sides of the bottom surface 1421 in an upward direction. For example, the settling groove 1423 may be formed by a concave space formed by the bottom surface 1421 and the pair of guide surfaces 1422.

The bottom surface 1421 may be formed to have a width in a direction parallel to a central axis of a wheel of the main gear 240, and the guide surface 1422 may extend from both edges of the bottom surface 1421 facing in a direction parallel to the central axis of the wheel. A width of the bottom surface 1421 may be greater than or substantially equal to a width of the wheel 144. The width of the wheel 144 can denote a length in a direction of the central axis.

The guide surfaces 1422 may guide the main gear 240 to be aligned in a given position. For example, when the aircraft 200 moves to the moving device 140, in a case in which the wheel of the main gear 240 does not move by being aligned with the bottom surface 1421 and moves while contacting one or both of the guide surface 1422, the guide surface 1422 is formed to be inclined in the direction of gathering toward the bottom surface 1421, so that the wheel is aligned to be stably accommodated on the bottom surface 1421.

The main gear 240 mounted in the gear settling portion 142 may be fixed using a tiedown strap and/or using a brake device (e.g., a parking brake) of the main gear 240 itself. For example, in a state in which the main gear 240 is accommodated in contact with the bottom surface 1421 of the gear settling portion 142, the main gear 240 may be fixed so as not to rotate or move on the bottom surface 1421 by engaging a parking brake.

An upward direction is a direction in which the bottom surface 1421 faces and indicates a direction oriented from the wheel connection portion 143 to the gear settling portion 142, and a downward direction, opposite to the upward direction, is a direction oriented from the gear settling portion 142 to the wheel connection portion 143.

The wheel connection portion 143 may extend from a lower portion of the gear settling portion 142 to connect the wheel 144. The wheel connection portion 143 may support the motor 145 and the communication controller 148 along with the wheel 144. For example, the wheel 144, motor 145, and communication controller 148 may be mounted in the wheel connection portion 143 to form one assembly with the jig 141.

The wheel connection portion 143 may include a first connection portion 1431 and a second connection portion 1432 extending to face each other. The first connection portion 1431 and the second connection portion 1432 may be formed to be spaced apart so that the wheel 144 is positioned therebetween. For example, the first connection portion 1431 and the second connection portion 1432 may face both ends of the wheel 144, respectively.

The motor 145 may be positioned in the wheel connection portion 143. For example, a motor body 146 of the motor 145 may be connected to one of the first connection portion 1431 and the second connection portion 1432 of the wheel connection portion 143, and a shaft 147 of the motor 145 extending from the motor body 146 may penetrate through the other one of the first connection portion 1431 and the second connection portion 1432.

The communication controller 148 may be positioned in the wheel connection portion 143. For example, the communication controller 148 may be positioned on one of the first connection portion 1431 and the second connection portion 1432 in which the motor body 146 is positioned.

The wheel 144 may be rotatably connected to the jig 141. For example, the wheel 144 may be rotatably connected to the wheel connection portion 143 of the jig 141. The wheel 144 may be positioned between the first connection portion 1431 and the second connection portion 1432 and may be rotatably connected to the wheel connection portion 143 through the motor 145. For example, the wheel 144 may be coupled to the motor 145 penetrating through the first connection portion 1431 and the second connection portion 1432, and may be connected to the wheel connection portion 143 via the motor 145. The wheel 144 may be rotated by driving force of the motor 145. The wheel 144 may be connected to the shaft 147 of the motor 145, and may be rotated together with the shaft 147 when the shaft 147 rotates.

The wheel 144 may be accommodated on the transfer rail 130 and may move while rotating along the transfer rail 130. For example, the wheel 144 may perform rotational motion and translational motion with respect to the transfer rail 130. The wheel 144 may include a groove 1441 in which at least a portion of the transfer rail 130 is positioned so that the wheel 144 is stably mounted on the transfer rail 130 and rotates. The groove 1441 may be formed with a width corresponding to the transfer rail 130. For example, when the moving device 140 is mounted on the transfer rail 130, the transfer rail 130 can be partially accommodated in the groove 1441 of the wheel 144, thereby preventing separation of the wheel 144 from the transfer rail 130.

According to the illustrated embodiment, a groove 1441 is formed in the wheel 144 and the transfer rail 130 has a protruding shape corresponding to the groove 1441, but this is an example, and these shapes may be deformed opposite to each other. For example, the transfer rail 130 and the wheel 144 may be deformed so that the transfer rail 130 has a concave groove shape and the wheel 144 is partially accommodated in the transfer rail 130 having the concave shape.

The motor 145 may provide driving force for moving the moving device 140. The motor 145 may be positioned on the wheel connection portion 143. The motor 145 may rotate the wheel 144 by transmitting the driving force to the wheel 144. The motor 145 may be coupled to the wheel connection portion 143 and the wheel 144. For example, the motor 145 may be provided so that a portion thereof is coupled to the wheel connection portion 143 and the other portion thereof is coupled to the wheel 144.

The motor 145 may include a motor body 146 for generating driving force and a shaft 147 which can be connected to the motor body 146 and to which the wheel 144 can be connected. The motor body 146 and the shaft 147 may be coupled to the wheel connection portion 143. The motor body 146 may be fixedly coupled to the wheel connection portion 143, and the shaft 147 may be rotatably coupled to the wheel connection portion 143. At least a portion of the shaft 147 may be inserted into the wheel 144, and the wheel 144 may be provided to rotate through the rotation of the shaft 147.

According to the embodiment illustrated in FIG. 3, the motor body 146 may be coupled to the first connection portion 1431, and the shaft 147 may extend from the motor body 146 and penetrate through the second connection portion 1432. One end (e.g., a left end based on FIG. 3) of the shaft 147 may be coupled to the motor body 146 to receive the driving force from the motor body 146, and the other end (e.g., a right end based on FIG. 3) of the shaft 147 may be rotatably coupled to the second connection portion 1432. For example, a bearing 149 for rotating the shaft 147 may be positioned between an outer circumferential surface of the other end of the shaft 147 penetrating through the second connection portion 1432, and the second connection portion 1432.

The communication controller 148 may transmit/receive a signal for control and/or operation of the moving device 140. For example, the moving device 140 may receive control information or a control signal from the moving device controller 161 through the communication controller 148, and may generate driving force of the motor 145 based on the transmitted information or signal.

The communication controller 148 may be positioned in the wheel connection portion 143. The communication controller 148 may be coupled to the motor 145. For example, the communication controller 148 may be coupled to the motor body 146. The communication controller 148 may be provided to be detachably attached to the wheel connection portion 143. For example, the communication controller 148 may be detachably coupled to the motor 145. A coupling position of the communication controller 148 is not limited to the motor body 146.

The communication controller 148 may be electrically connected to the motor 145. For example, the communication controller 148 may be electrically connected to the motor body 146 to transmit the control signal provided from the moving device controller 161 to the motor 145.

The communication controller 148 may be provided to be detachably attached to the wheel connection portion 143. For example, the communication controller 148 may be detachably coupled to the motor 145.

Referring to FIG. 4, a rail accommodating groove 119 may be formed by being recessed from the port body 110 to a designed, selected, or predetermined depth, and the transfer rail 130 may be positioned on a bottom surface of the rail accommodating groove 119. The moving device 140 may be accommodated on the transfer rail 130 while being accommodated within the rail accommodating groove 119.

The rail accommodating groove 119 may be recessed from the floor 117 by a depth sufficient to be accommodated in the gear settling portion 142 of the moving device 140 by moving the aircraft 200 positioned in the takeoff and landing area 111 or the transfer area 113. For example, the takeoff and landing area 111 and the transfer area 113 may be positioned at the same height as the floor 117, and the rail accommodating groove 119 may be recessed to a depth at which the bottom surface 1421 of the gear settling portion 142 may be positioned at the same height as the floor 117 or may be positioned at a height lower than the floor 117 by a specified length L in a state in which the moving device 140 is accommodated on the transfer rail 130.

According to the embodiment illustrated in FIG. 4, the rail accommodating groove 119 may be formed at a depth such that the bottom surface 1421 of the gear settling portion 142 is positioned below the floor 117 by a specified length L in a state in which the moving device 140 is accommodated on the transfer rail 130. As the specified length L is reduced, the main gear 240 of the aircraft 200 positioned on the floor 117 moves to stably and smoothly to perform an operation of being accommodated on the gear settling portion 142.

As described above, according to various embodiments, the specified length L may be substantially zero so that the bottom surface 1421 of the gear settling portion 142 of the moving device 140 accommodated on the transfer rail 130 is positioned on the same line as the floor 117.

On the other hand, when the moving device 140 is accommodated on the transfer rail 130, the bottom surface 1421 of the gear settling portion 142 does not necessarily have to be positioned at the same height as the floor 117 or at a lower height than the floor 117, and according to various embodiments, when the moving device 140 is accommodated on the transfer rail 130, the bottom surface 1421 of the gear settling portion 142 may be positioned to be higher than the floor 117 by a predetermined length.

Figure 5:
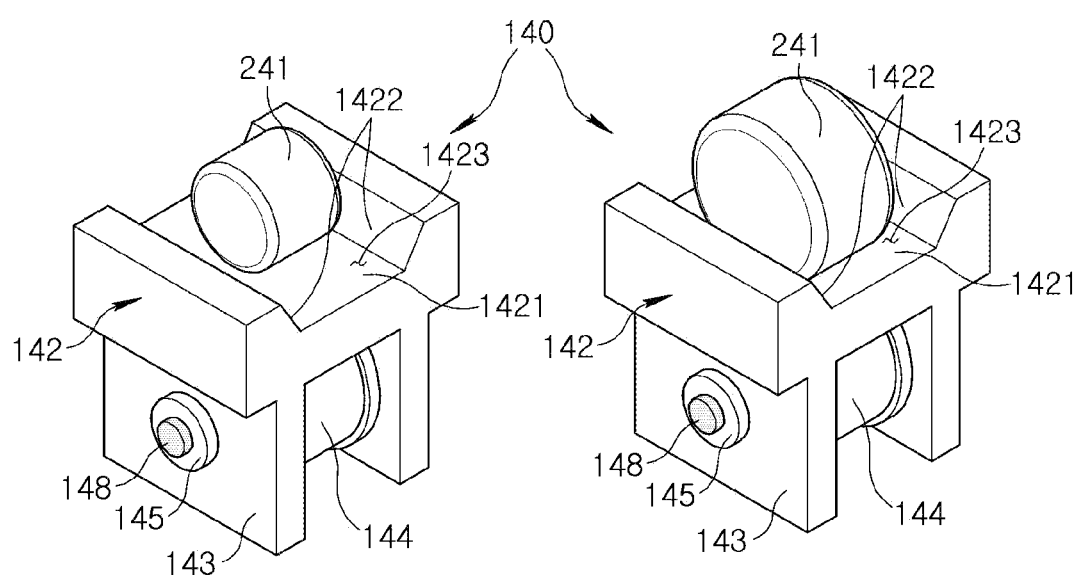
FIG. 5 are perspective views illustrating a state in which main gear members of various sizes are accommodated in a jig of a moving device in a vertiport system according to an embodiment of the present disclosure.

FIG. 5 illustrates a state in which the main gear 240 of various sizes is accommodated in the jig 141 of the moving device 140 in the vertiport system 100 according to an embodiment of the present disclosure.

The moving device 140 illustrated in FIG. 5 is the same as the moving device 140 described with reference to FIGS. 3 and 4, and duplicate descriptions thereof will be omitted below.

Referring to FIG. 5, the moving device 140 according to an embodiment may include a jig 141, a wheel 144, a motor 145, and a communication controller 148, and the jig 141 may include a gear settling portion 142 and a wheel connection portion 143.

The jig 141 of the moving device 140 may be provided with a taper-shaped settling groove 1423 so that the gear settling portion 142 may easily accommodate and align the main gear 240 (especially wheels) of various sizes.

Comparing left and right images of FIG. 5, even when a wheel size of the main gear 240 is relatively small or large, an alignment of the main gear 240 may be guided by the guide surface 1422, so that the wheel of the main gear 240 may be easily accommodated on the gear settling portion 142.

For example, in a state in which the wheel size of the main gear 240 is relatively large, when the aircraft 200 is moved to connect/install the aircraft 200 to the moving device 140, it may be somewhat difficult to move the aircraft 200 with the wheels of the main gear 240 accurately aligned on the bottom surface 1421. However, as inclined guide surfaces 1422 are provided on both sides of the bottom surface 1421, the main gear 240 may be aligned by the guide surface 1422 even if the wheels of the main gear 240 are not moved to a given position.

Figure 6A:
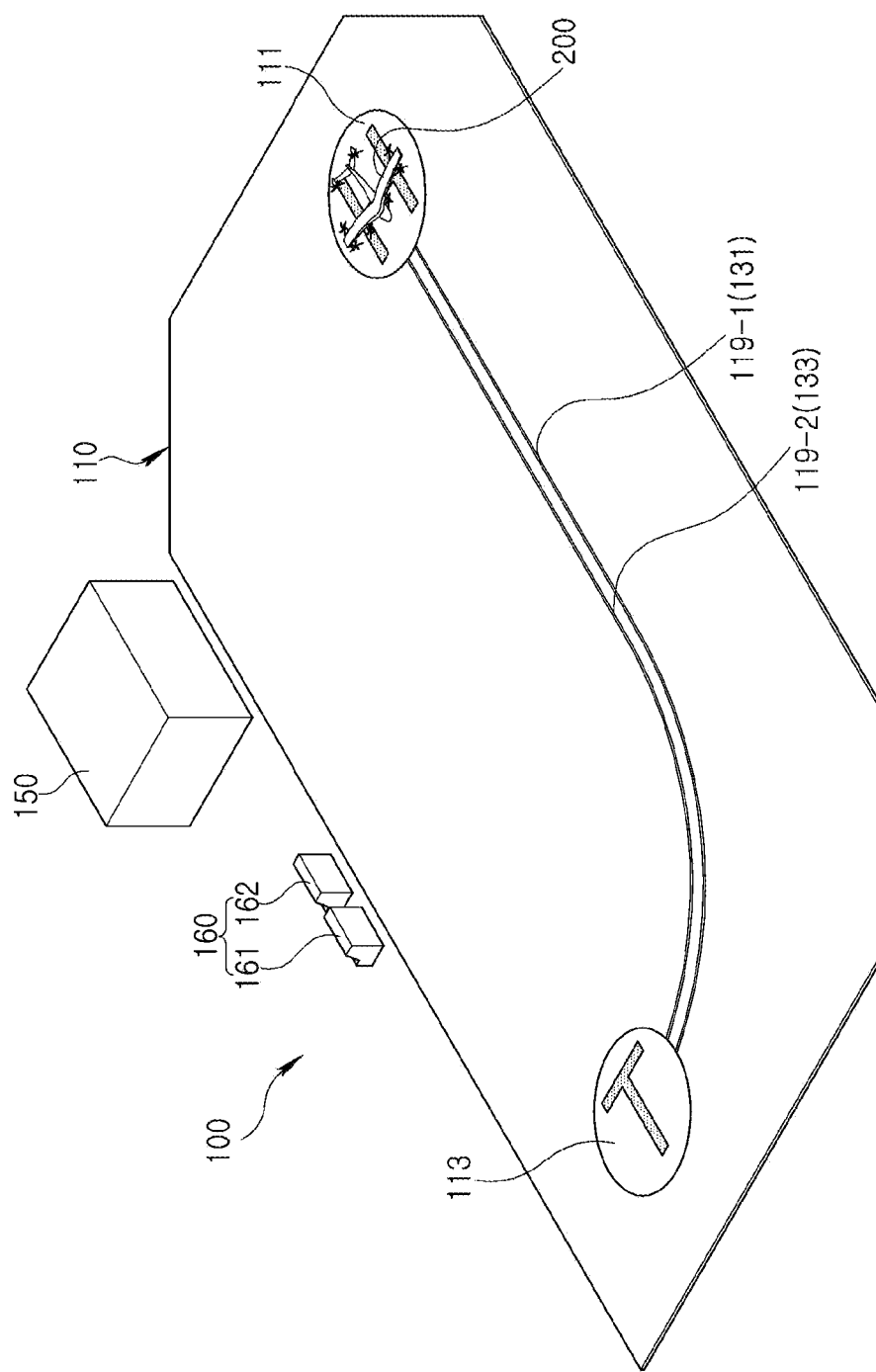
FIGS. 6A, 6B, and 6C are perspective views illustrating an operation in which an aircraft is transferred by a transfer unit of a vertiport system according to an embodiment of the present disclosure.
Figure 6B:
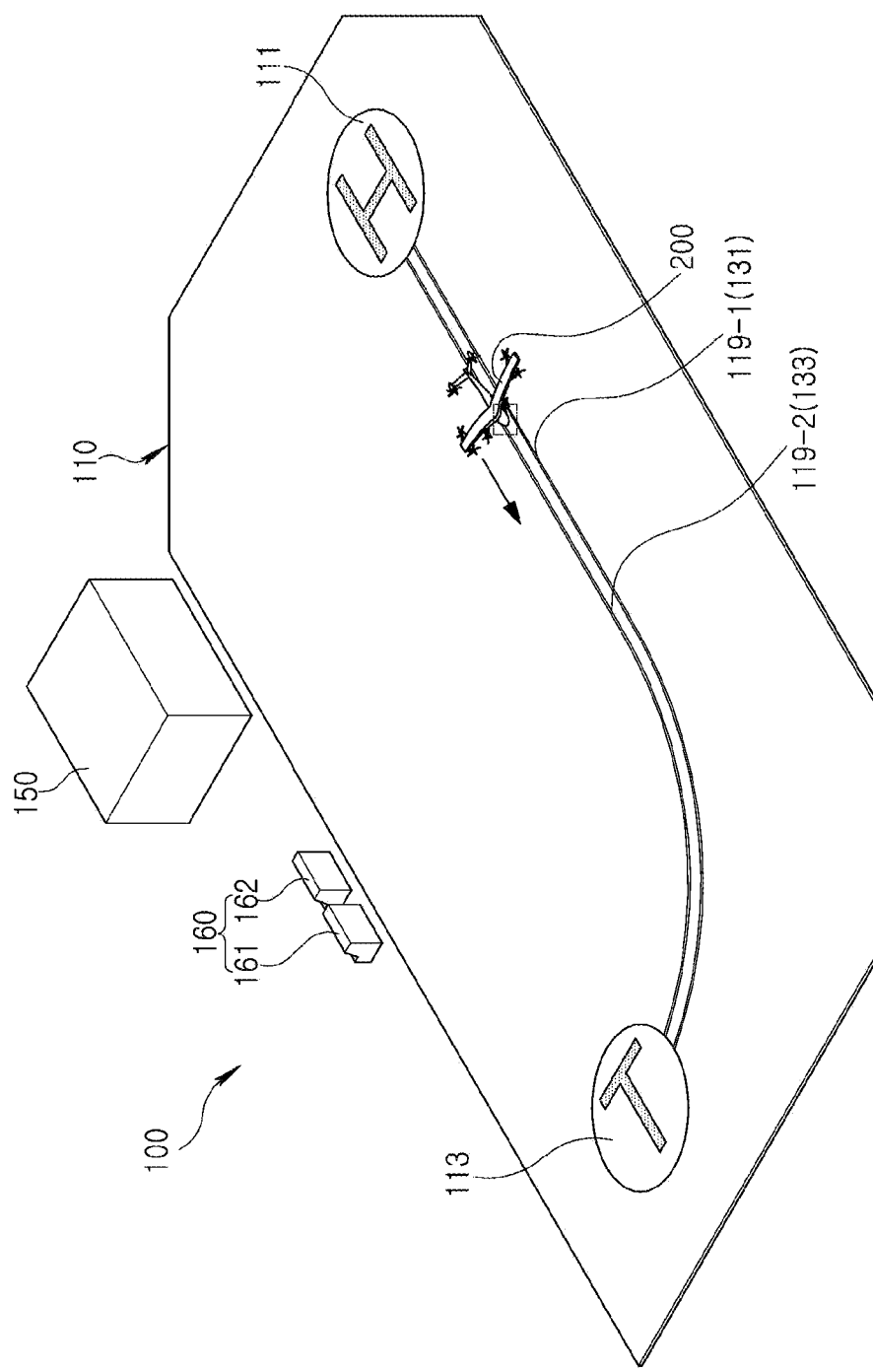
Figure 6C:
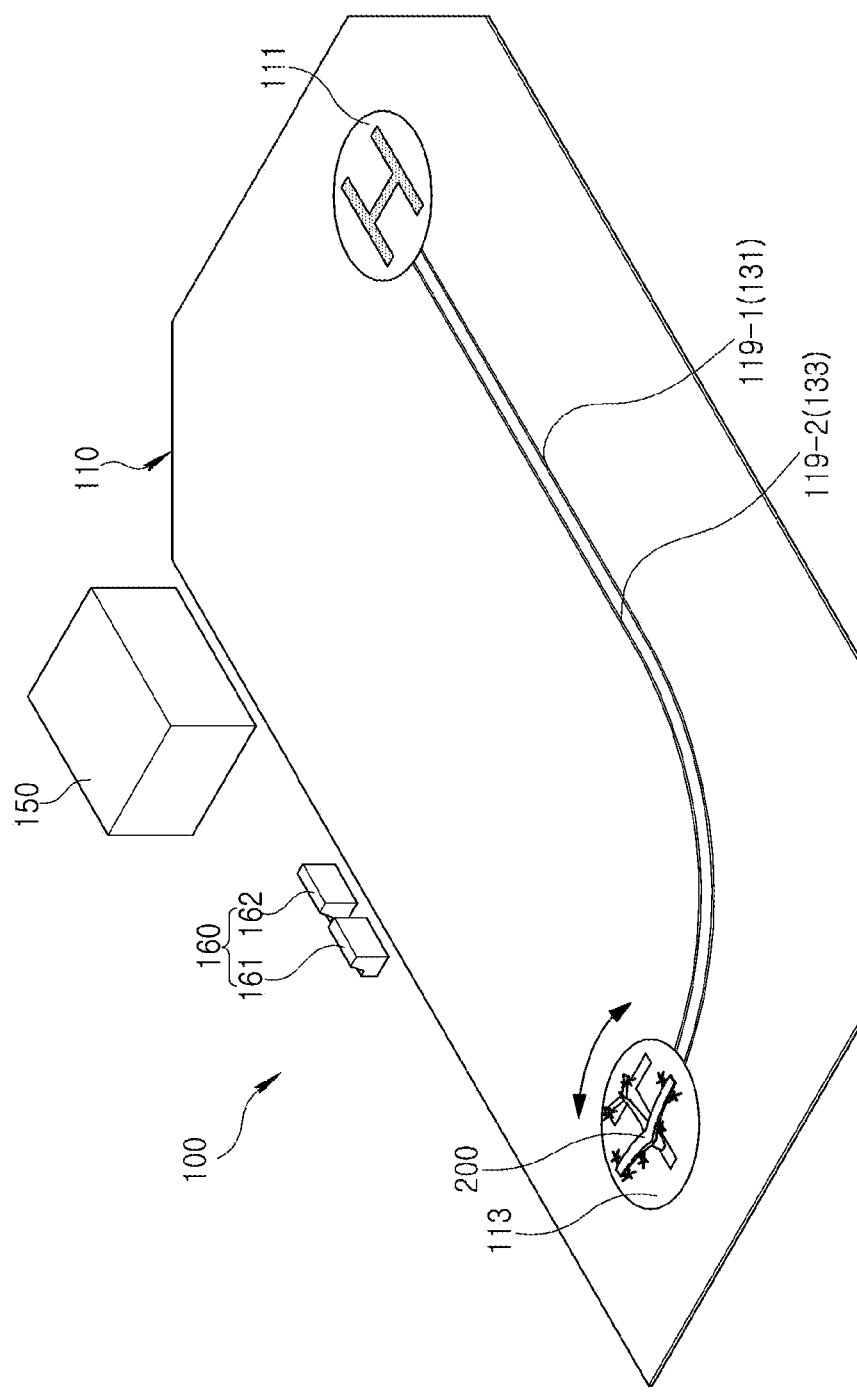

FIGS. 6A, 6B and 6C illustrate an operation in which the aircraft 200 is transferred by the transfer unit 120 of the vertiport system 100 according to an embodiment of the present disclosure.

FIGS. 6A, 6B and 6C illustrate an operation in which the aircraft 200 lands in the takeoff and landing area 111 and then is transferred to the transfer area 113 by the transfer unit 120. Hereinafter, in describing FIGS. 6A, 6B and 6C, FIGS. 1 to 4 are also referred to together.

Referring to FIG. 6A, the aircraft 200 lands in the takeoff and landing area 111 under the control of the control unit 150. After the aircraft 200 lands in the takeoff and landing area 111, the aircraft 200 moves to a position to be connected to the moving device 140. The aircraft 200 can be moved to a position to be connected to the moving device 140 by ground personnel, and the main gear 240 can be accommodated in the gear settling portion 142 of the moving device 140.

For example, ground personnel can manually transfer the aircraft 200 and accommodate the two main gear members 240 in the gear settling portions 142 of each of the first moving device 140a and the second moving device 140b. A nose gear 230 of the aircraft 200 can rotate and move while coming into contact with the floor 117 between the first rail 131 and the second rail 133. According to various embodiments, the aircraft 200 may be manually transferred by ground personnel pulling a tow-bar connected to the nose gear 230 of the aircraft 200. However, a manual transfer method of the aircraft 200 is not particularly limiting for an embodiment.

Referring to FIG. 6B, the main gear 240 may be accommodated in the gear settling portion 142 and a parking brake of the main gear 240 may be engaged to secure the main gear 240 to the moving device 140, and then, the aircraft 200 may be transferred by driving the moving device 140. The moving device 140 can move the aircraft 200 to the transfer area 113 by moving along the transfer rail 130. The moving device 140 can move along the transfer rail 130 by receiving control information from the moving device controller 161 and generating driving force of the motor 145.

The transfer rail 130 provided between the takeoff and landing area 111 and the transfer area 113 may include a straight section and a curved section. When the moving device 140 moves in the straight section, the first moving device 140a and the second moving device 140b can move in the same direction at the same speed. When the moving device 140 moves in the curved section, the first moving device 140a and the second moving device 140b can move in the same direction at different speeds. For example, based on the shape of the transfer rail 130 illustrated in FIG. 6B, the second moving device 140b moving along the second rail 133 in the curved section may move at a relatively slower speed than the first moving device 140a moving along the first rail 131, and may stably transfer the aircraft 200 even in the curved section.

When the moving device 140 moves in the straight section, the moving device controller 161 may generate and transmit a control signal for moving the first moving device 140a and the second moving device 140b in the same direction at the same speed, and when the moving device 140 moves in the curved section, the moving device controller 161 may generate and transmit the control signal for moving the first moving device 140a and the second moving device 140b in the same direction at different speeds. Whether to control the speed of the first moving device 140a or the second moving device 140b relatively slowly may be determined based on a direction of the curved section. For example, unlike the drawing, when a section is bent from the straight section to the left (e.g., a side in which the first main gear 241, the first rail 131, or the first moving device 140a is located), a speed of the first moving device 140a moving on the first rail 131 is controlled to be slower than a speed of the second moving device 140b moving on the second rail 133.

Additionally, whether to control the speeds of the first moving device 140a and the second moving device 140b to a different degree may be determined based on a curvature of the curved section. For example, when the curvature of the curve section is relatively large, a speed difference between the first moving device 140a and the second moving device 140b increases, and when the curvature of the curved section is relatively small, the speed difference between the first moving device 140a and the second moving device 140b decreases.

According to various embodiments, when the moving device 140 moves along the transfer rail 130, steering of the nose gear 230 may be controlled by a pilot of the aircraft 200. For example, the main gear 240 may move the transfer rail 130 in the curved section by the moving device 140 that moves along the transfer rail 130. However, because the nose gear 230 does not move along a designated path, steering in response to the curved section may be required, and the steering of the nose gear 230 may be performed by a pilot manipulating a steering device provided in a cockpit of the aircraft 200.

Referring to FIG. 6C, after the aircraft 200 is transferred to a position adjacent to the transfer area 113, the aircraft 200 can be moved to the transfer area 113 by ground personnel. For example, when the moving device 140 has moved to an end of the transfer rail 130 connected to the transfer area 113, after releasing the parking brake of the main gear 240, the ground personnel may manually transfer the aircraft 200 and locate the aircraft 200 in the transfer area 113. After the aircraft 200 is located in the transfer area 113, a direction in which the aircraft 200 faces may be adjusted by rotating the transfer area 113 as necessary.

Figure 7:
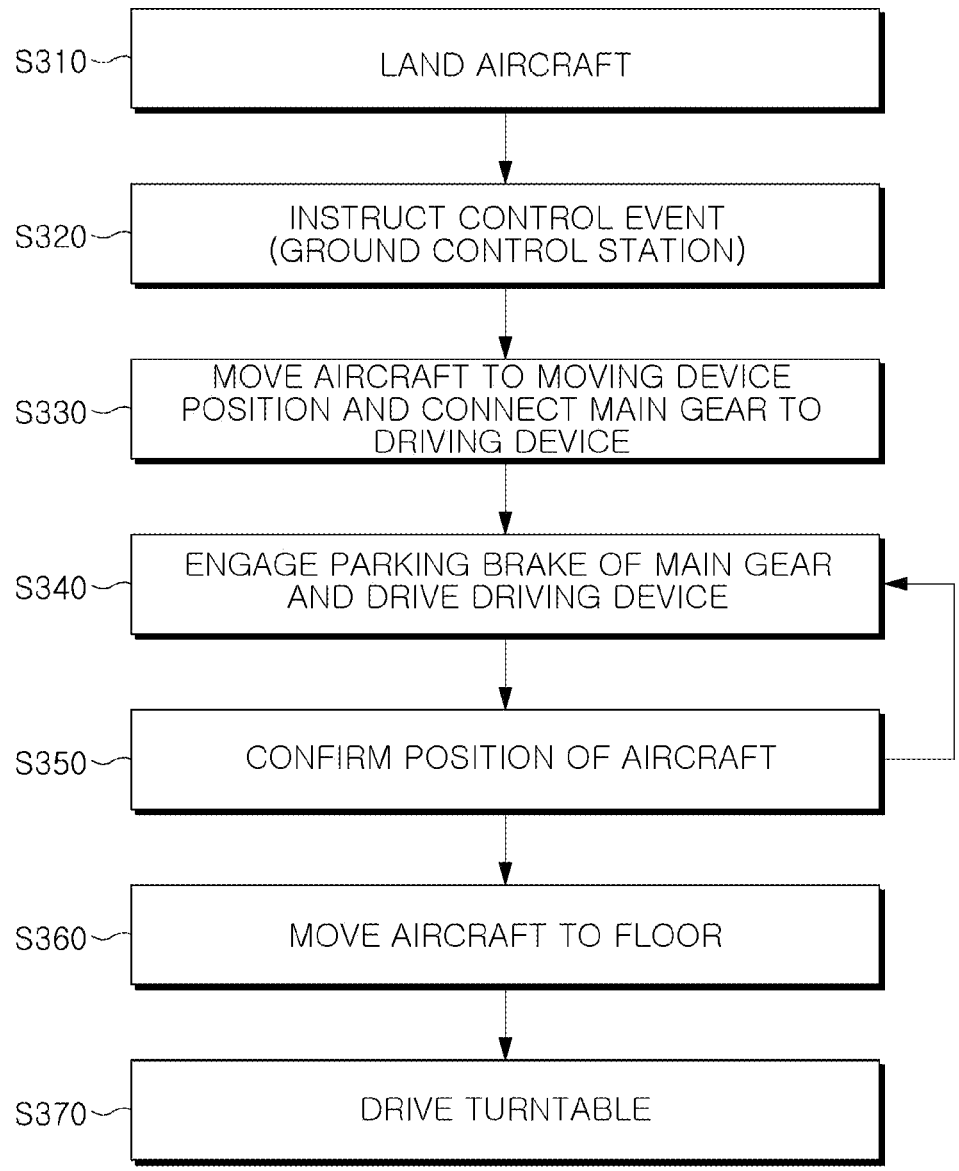
FIG. 7 is a flowchart illustrating a method of controlling a vertiport system according to an embodiment of the present disclosure.

FIG. 7 illustrates a control method of a vertiport system 100 according to an embodiment of the present disclosure.

FIG. 7 is a flow chart illustrating a control method of the vertiport system 100 previously described with reference to FIGS. 1 to 4, and some operations of FIG. 7 may be performed by at least some components of the vertiport system 100 illustrated in FIGS. 1 to 4.

Hereinafter, in describing FIG. 7, FIGS. 1 to 4 will be referred to together, and the content overlapping the previous description can be omitted.

Referring to FIG. 7, a control method of the vertiport system 100 according to an embodiment may include an operation in which the aircraft lands (operation S310), an operation of instructing a control event (operation S320), an operation of connecting the main gear to the moving device (operation S330), an operation of driving the moving device (operation S340), an operation of confirming a position of the aircraft (operation S350), an operation of moving the aircraft to the floor (operation S360), and an operation of driving a turntable (operation S370).

In the operation in which the aircraft lands (operation S310), the aircraft 200 may land in the takeoff and landing area 111.

In the operation of instructing a control event (operation S320), the control unit 150 may comprehensively consider an environment within a control area and deliver control information and instructions for the transfer of the aircraft 200 to the controller 160 and ground personnel.

In the operation of connecting the main gear (operation S330), the ground personnel may manually move the aircraft 200 to a position of the moving device 140 mounted on the transfer rail 130 and accommodate the main gear 240 of the aircraft 200 in the moving device 140. For example, the aircraft 200 can move by rotation of the main gear 240 while being positioned on the floor 117 of the takeoff and landing area 111, so that the main gear 240 can be accommodated in the gear settling portion 142 of the moving device 140.

In the operation of driving the moving device (operation S340), after engaging a parking brake of the main gear 240 and fixing the main gear 240 to prevent the rotation of the main gear 240, the motor 145 of the moving device 140 may operate. The moving device 140 may move along the transfer rail 130 by an operation of the motor 145 and may transfer the aircraft 200.

In the operation of confirming a position of the aircraft (operation S350), it may be possible to confirm the position of the aircraft 200 and confirm whether a transfer of the aircraft 200 has been completed to a target location where the aircraft 200 can be manually moved to the transfer area 113. The target position can refer to a position of the aircraft 200 in a state in which the moving device 140 is moved to an end of the transfer rail 130 connected to the transfer area 113. As a result of confirming the position of the aircraft 200, when an additional transfer is necessary/desired, the moving device 140 can continue to be driven, and when the transfer to the target position is completed, the driving of the moving device 140 may be stopped.

In the operation of moving the aircraft to the floor (operation S360), when the transfer of the aircraft 200 to the target location is completed and the driving of the moving device 140 stops, the parking brake of the main gear 240 can be released, and the ground personnel manually can move the aircraft 200 from the moving device 140 to the transfer area 113.

In the operation of driving a turntable (operation S370), a direction of the aircraft 200 may be adjusted by rotating the transfer area 113 in which the aircraft 200 is located.

Although the example embodiment of the present disclosure has been described in detail above, the scope of the present disclosure is not necessarily limited thereto, and various modifications and variation may be made without departing from the technical concepts of the present disclosure described in the claims.

Furthermore, in embodiments of the present disclosure, some components may be implemented in a deleted state, and the configurations of each embodiment may be configured in combination with each other.

What is claimed is:

1. A vertiport system comprising:
a first area;
a second area in a different location from the first area; and
a transfer unit configured to transfer an aircraft between the first area and the second area,
wherein the transfer unit comprises:
at least one transfer rail connecting the first area and the second area, and
at least one moving device configured to accommodate at least a portion of a landing gear of the aircraft and configured to move the aircraft along the at least one transfer rail,
wherein the at least one moving device comprises:
a first moving device configured to accommodate a first main gear of the landing gear, and
a second moving device configured to accommodate a second main gear of the landing gear, and
wherein the at least one transfer rail comprises:
a first rail configured to guide the first moving device, and
a second rail configured to guide the second moving device.

2. The system of claim 1, wherein the at least one moving device comprises:
a jig configured to connect to the landing gear,
a wheel rotatably coupled to the jig, and
a motor connected to the jig and configured to provide a driving force to rotate the wheel.

3. The system of claim 2,
wherein the jig comprises:
a gear settling portion configured to accommodate the landing gear, and
a wheel connection portion to which the wheel is connected, and
wherein the motor is positioned at the wheel connection portion and coupled to the wheel.

4. The system of claim 1, further comprising:
a moving device controller configured to control an operation of the at least one moving device, wherein the at least one moving device further comprises a communication controller configured to receive a receiving signal from the moving device controller or transmit a transmitting signal to the moving device controller.

5. The system of claim 4, wherein the moving device controller is configured to generate a moving signal including at least one of or any combination of whether the at least one moving device is driven, a moving speed, and a moving direction, and wherein the moving device controller is further configured to transmit the moving signal to the communication controller.

6. The system of claim 5, wherein the communication controller is connected to a motor, and wherein the communication controller is configured to control driving of the motor based on the moving signal received from the moving device controller.

7. The system of claim 3,
wherein the wheel connection portion is positioned below the gear settling portion, and
wherein the gear settling portion comprises a settling groove having a tapered shape narrowing downwardly.

8. The system of claim 7, wherein the gear settling portion comprises:
a bottom surface configured to accommodate the landing gear thereon, and
a pair of guide surfaces extending obliquely outwardly in an upward direction from two sides of the bottom surface.

9. The system of claim 8, wherein the guide surfaces are configured to guide the landing gear to be aligned with the bottom surface during settling the landing gear in the gear settling portion due to a movement of the aircraft.

10. The system of claim 8,
wherein the first area, the second area and the at least one transfer rail are provided on a floor of a port body, and
wherein a rail accommodating groove recessed to a first depth is located in the floor such that the first rail or the second rail is positioned in the rail accommodating groove.

11. The system of claim 10, wherein the first depth of the rail accommodating groove and a respective first or second moving device is configured so that the bottom surface of the gear settling portion is positioned at a same height as the floor, in a state in which the respective first or second moving device is accommodated on the first rail or the second rail.

12. The system of claim 10, wherein the first depth of the rail accommodating groove and a respective first or second moving device is configured so that the bottom surface of the gear settling portion is positioned at a height lower than the floor by a specified length, in a state in which the respective first or second moving device is accommodated on the first rail or the second rail.

13. The system of claim 1, wherein the first rail and the second rail have a same shape and are spaced apart from each other at a first distance.

14. The system of claim 1, further comprising:
a moving device controller,
wherein each of the first and second rails has a layout including a straight section and a curved section, and
wherein the moving device controller is configured to control the first moving device and the second moving device so that the first moving device and the second moving device move at different speeds in the curved section.

15. The system of claim 13, wherein the system is configured so that, in a state in which the at least one moving device is positioned on the at least one transfer rail, the first and second main gears are accommodated in the first and second moving devices, respectively.

16. The system of claim 15, wherein a nose gear of the landing gear is in direct contact with a portion of a floor of a port body and positioned between the first rail and the second rail.

17. A vertiport system comprising:
a first area;
a second area in a different location from the first area; and
a transfer unit configured to transfer an aircraft between the first area and the second area,
wherein the transfer unit comprises:
a transfer rail connecting the first area and the second area, and
a moving device configured to accommodate at least a portion of a landing gear of the aircraft and configured to move the aircraft along the transfer rail,
wherein the first area, the second area and the transfer rail are provided on a floor of a port body,
wherein a rail accommodating groove recessed to a first depth is located in the floor such that the transfer rail is positioned in the rail accommodating groove, and
wherein the first depth of the rail accommodating groove and the moving device are configured so that a bottom surface of a gear settling portion is positioned at a same height as the floor, in a state in which the moving device is accommodated on the transfer rail.

18. A vertiport system comprising:
a first area;
a second area in a different location from the first area; and
a transfer unit configured to transfer an aircraft between the first area and the second area,
wherein the transfer unit comprises:
a transfer rail connecting the first area and the second area, and
a moving device configured to accommodate at least a portion of a landing gear of the aircraft and configured to move the aircraft along the transfer rail,
wherein the first area, the second area and the transfer rail are provided on a floor of a port body,
wherein a rail accommodating groove recessed to a first depth is located in the floor such that the transfer rail is positioned in the rail accommodating groove,
wherein the first depth of the rail accommodating groove and the moving device are configured so that a bottom surface of a gear settling portion is positioned at a height lower than the floor by a specified length, in a state in which moving device is accommodated on the transfer rail.

* * * * *